United States Patent [19]

Yazawa et al.

[11] Patent Number: 5,008,884
[45] Date of Patent: Apr. 16, 1991

[54] PRIVATE AUTOMATIC BRANCH EXCHANGE SYSTEM WITH LINE ACCESSING NUMBER ADDING FEATURE

[75] Inventors: Shigehiko Yazawa; Toru Ogawa; Haruo Moritomo, all of Kawasaki; Yoshiaki Suya, Yokohama; Mikio Nakayama, Tokyo, all of Japan

[73] Assignee: Fujitsu Limited, Kawasaki, Japan

[21] Appl. No.: 346,544

[22] Filed: May 2, 1989

[30] Foreign Application Priority Data

May 10, 1988 [JP] Japan ................................. 63-111698
Sep. 12, 1988 [JP] Japan ................................. 63-227904

[51] Int. Cl.$^5$ ............................ H04J 3/02; H04J 3/12; H04J 3/08
[52] U.S. Cl. ............................ 370/110.1; 370/58.1; 370/60
[58] Field of Search ............... 370/110.1, 58.1, 60, 370/60.1

[56] References Cited

U.S. PATENT DOCUMENTS

| 4,125,745 | 11/1978 | Steidl | 370/110.1 |
| 4,788,682 | 11/1988 | Vij et al. | 370/110.1 |
| 4,805,171 | 2/1989 | Ewell | 370/110.1 |
| 4,866,704 | 9/1989 | Bergman | 370/110.1 |
| 4,888,766 | 12/1989 | Ogasawara | 370/110.1 |

FOREIGN PATENT DOCUMENTS 60-144049  7/1985  Japan .

Primary Examiner—Douglas W. Olms
Assistant Examiner—Min Jung
Attorney, Agent, or Firm—Staas & Halsey

[57] ABSTRACT

Disclosed is a PBX system connected through a communication line (61) to an ISDN public network (101), comprising a control unit connected to a PBX switching network. The control unit comprises a unit for adding a line accessing number ($a$) to a calling party address (#B) in an incoming call information (ii) received through the communication line so as to form an incoming information (iii) to be received by said extension terminal, and a unit for transmitting the incoming information including the line accessing number to the extension terminal in which the line accessing number is displayed, whereby the user can recognize whether the incoming call is from the ISDN public network or from another extension terminal accommodated by the PBX system.

24 Claims, 14 Drawing Sheets

| | (i) | (ii) |
|---|---|---|
| CALLING PARTY ADDRESS | # A | # A |
| CALLING PARTY SUBADDRESS | # ① | # ① |
| CALLED PARTY ADDRESS | # B | # B |
| CALLED PARTY SUBADDRESS | # ② | # ② |

| | (iii) | (iv) |
|---|---|---|
| CALLING PARTY ADDRESS | # B | # B |
| CALLING PARTY SUBADDRESS | # ② | # ② |
| CALLED PARTY ADDRESS | # A | # A |
| CALLED PARTY SUBADDRESS | # ① | # ① |

PRIVATE AUTOMATIC BRANCH EXCHANGE SYSTEM WITH LINE ACCESSING NUMBER ADDING FEATURE

BACKGROUND OF THE INVENTION (1) Field of the Invention

The present invention relates to a private automatic exchange (PBX) system for controlling a calling party address in an Integrated Systems Digital Network (ISDN public network), and more particularly, to a connecting system between a terminal connected to an ISDN public network and an extension terminal accommodated by a PBX system.

To connect an ISDN public network and a PBX system, it is required to be able to deal with an extension terminal accommodated by the PBX system on an equal basis with a terminal connected to the ISDN.

(2) Description of the Related Art

In a conventional PBX system, as described later in more detail with reference to the drawings, when a call is effected from a terminal connected to the ISDN public network to an extension terminal accommodated by the PBX system, the extension terminal receives the calling party address from the calling party terminal through the ISDN public network and a PBX network in the PBX system. The called party extension terminal, however, could not identify whether the received calling party address is from a terminal connected to the ISDN network or from another extension terminal accommodated by the PBX system. This was inconvenient for the user of the PBX system. Namely, for example, if the user is away from the called party extension terminal, when a call is made to the extension terminal. After the termination of the call, if the user wants to return the call to the person at the calling party terminal, the user cannot call back to the calling party terminal because the user has no way of knowing whether the calling party was from the ISDN network or from another extension terminal accommodated by the PBX system.

SUMMARY OF THE INVENTION

Accordingly, an object of the present invention is to provide a private automatic branch exchange system which can distinguish whether an incoming call received by an extension terminal accommodated by the PBX system is a call from an another extension terminal accommodated by the PBX system or a call from a terminal connected to the ISDN public network.

Another object of the present invention is to provide a private automatic branch exchange system which can effect a call back from an extension terminal accommodated by the PBX system to a terminal, which previously originated a call to the extension terminal, connected to the ISDN public network.

There is provided, according to the present invention, a private automatic branch exchange system connected through a communication line to an ISDN public network, comprising a switching network for switching between the communication line connected to said ISDN public network and an extension line accommodated by the PBX system, a control unit for controlling the switching operation of the switching network, and an extension terminal accommodated by the PBX system and connected through the extension line to the switching network. The control unit operates to add a line access number to a calling party address in incoming call information received through the communication line so as to form incoming information to be received by the extension terminal, and to transmit the incoming information including the line access number to the extension terminal. The extension terminal comprises a display unit for displaying the incoming information including the line access number, or ringing generators for generating different sounds depending on the line access number received.

BRIEF DESCRIPTION OF THE DRAWINGS

The above objects and features will be more apparent from the following description of the preferred embodiments with reference to the drawings, wherein.

DESCRIPTION OF THE PREFERRED EMBODIMENT

For better understanding of the present invention, the background and the conventional connecting system between a terminal connected to an ISDN public network and an extension terminal accommodated by a PBX system will first be described with reference to FIGS. 1 to 5.

Note, throughout the specification, the same reference numbers represent the same parts.

Figure 1:
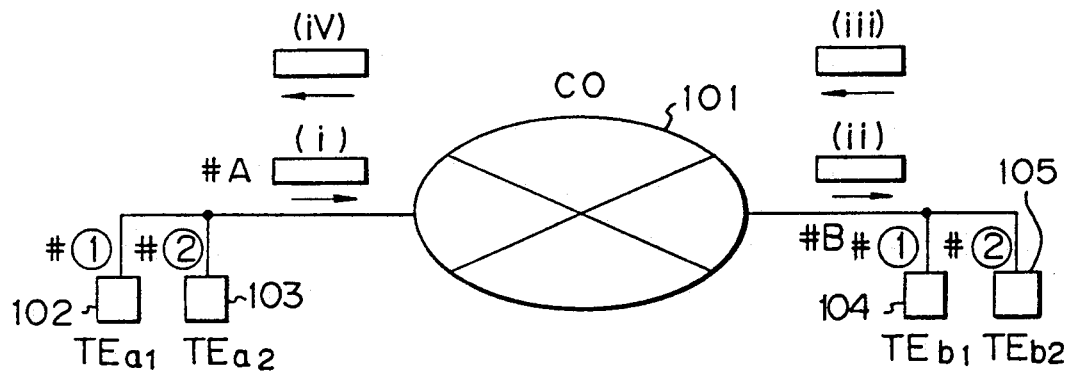
FIG. 1 is a diagram showing a conventional connecting system in an ISDN, for explaining the background of the invention.

FIG. 1 is a diagram showing a conventional connecting system in an ISDN public network, for explaining the background of the invention. In FIG. 1, 101 is an ISDN (CO), and 102 to 105 are ISDN terminals (TE$_{a1}$, TE$_{a2}$, TE$_{b1}$, TE$_{b2}$), respectively. In an ISDN public network, eight ISDN terminals at a maximum can be connected to each subscriber line which is a bus. Each ISDN terminal has a main address or, in other words, a subscriber line number for identifying the subscriber line and, in addition, a subaddress for identifying the ISDN terminal.

In the conventional example shown in FIG. 1, a subscriber line A is provided with a subscriber line number #A and subaddresses #① or #② for identifying the ISDN terminal (TE$_{a1}$ or TE$_{a2}$) 102 or 103 connected to the subscriber line A. Similarly, a subscriber line B is provided with a subscriber line number #B and subaddresses #① or #② for identifying the ISDN terminal (TE$_{b1}$ or TE$_{b2}$) 104 or 105 connected to the subscriber line B.

Numerals (i), (ii), (iii) and (iv) represent signals including call setup messages for setting up calls. In each call setup message passing through the ISDN public network, there are four fields for transmitting address information, i.e., a calling party address (or in other words a calling party main address), a calling party subaddress, a called party address (or in other words a called party main address), and a called party subaddress. By setting appropriate data in these fields, a call setup is effected.

Figure 2:
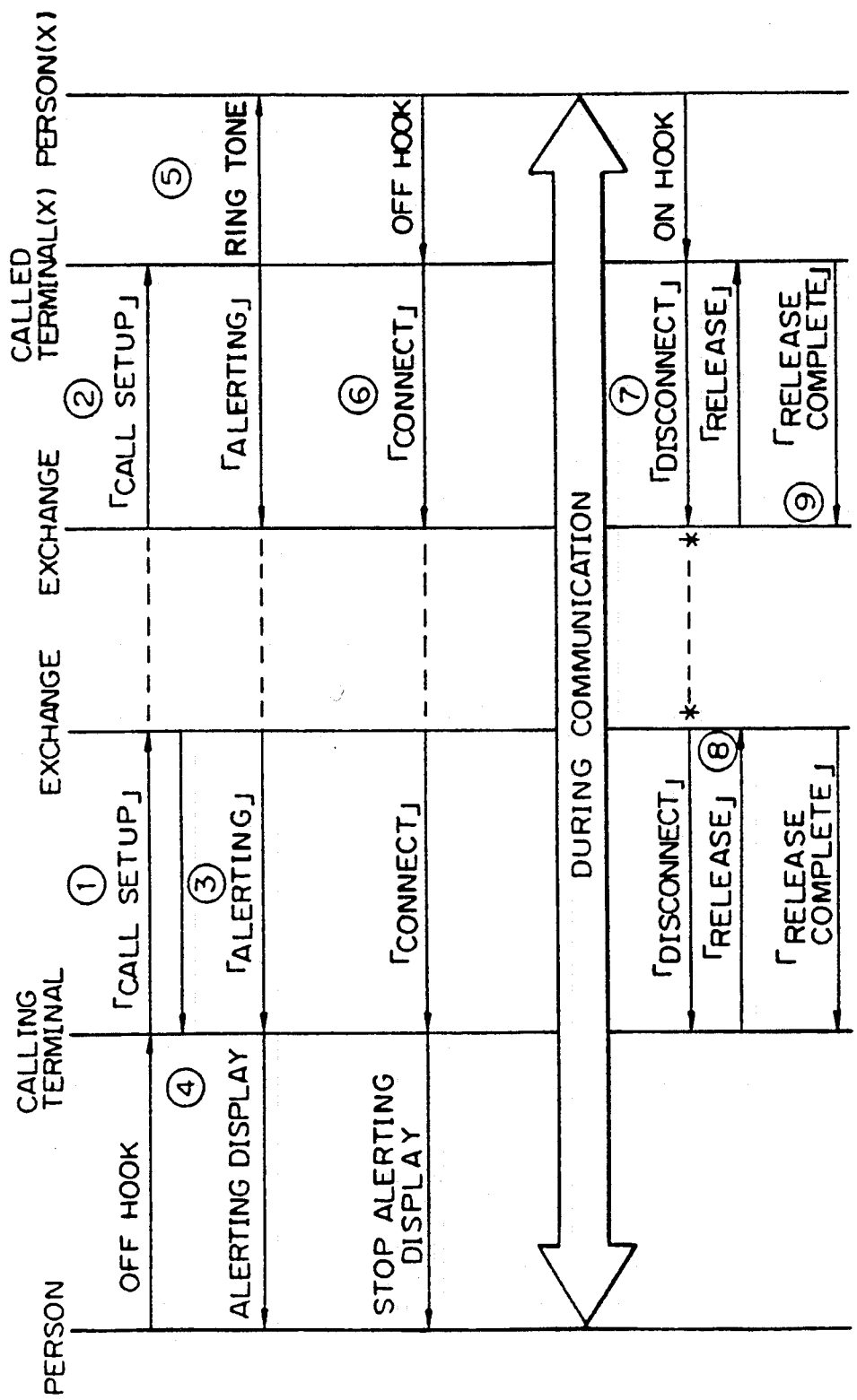
FIG. 2 is a diagram showing a conventional call connection sequence.
Figure 3:
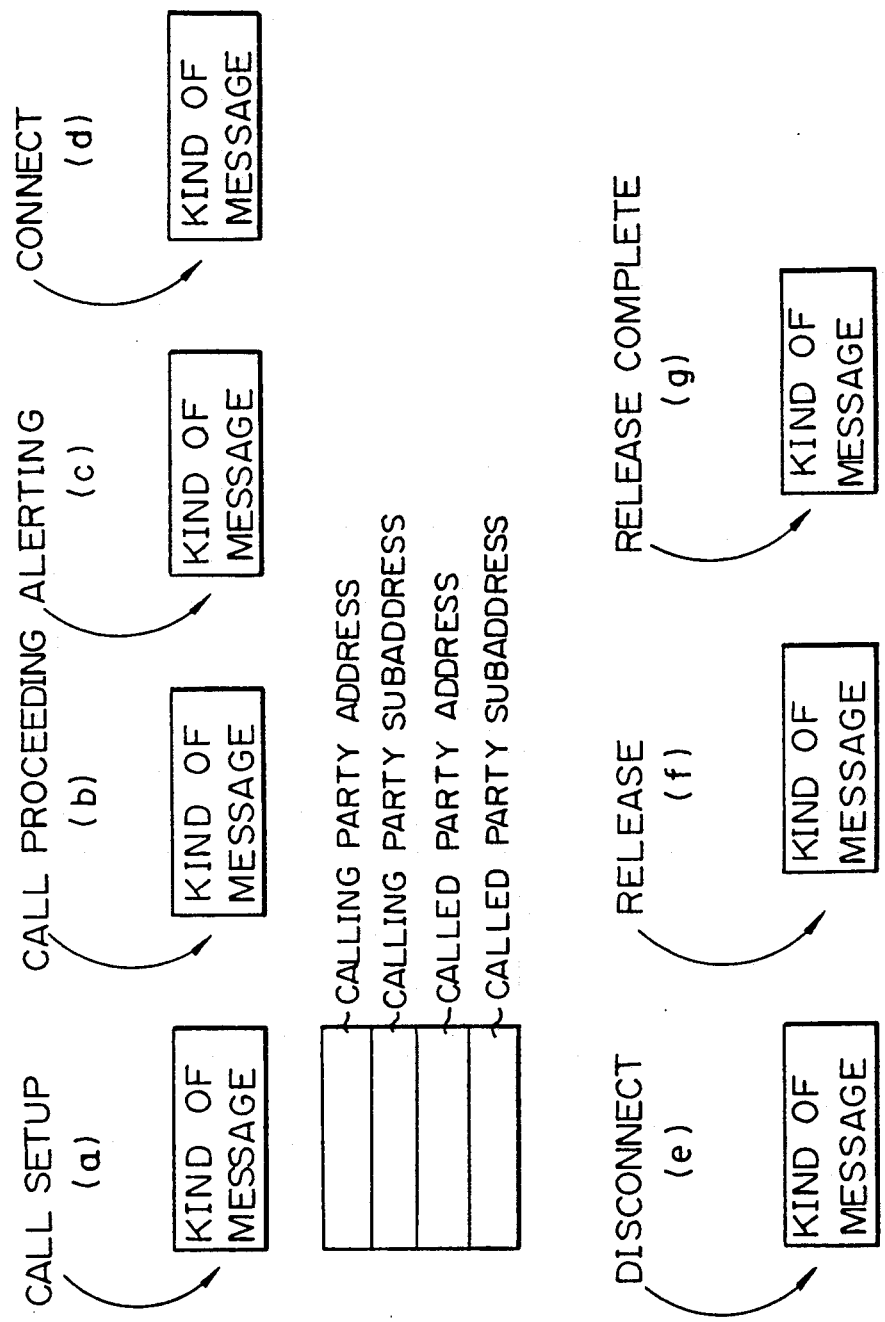
FIG. 3 is a diagram showing the contents of the messages in respective steps in the public network connection sequence.

FIG. 2 is a diagram showing a call connecting sequence in a public network, and FIG. 3 is a diagram showing contents of messages in respective steps in the public network connecting sequence.

Assuming that, in FIG. 1, a call is originated from the ISDN terminal (TE$_{a1}$) 102 to the ISDN terminal (TE$_{b2}$) 105, this case is practically described as an example with reference to FIG. 2 and FIG. 3.

First, when a person lifts the ISDN terminal (TE$_{a1}$) 102 off hook to call the ISDN terminal (TE$_{b2}$) 105, the call setup message (i) as illustrated in FIG. 1 is setup, and the call setup message (i) then sent to the ISDN public network (CO) 101 (see FIG. 2, ①). Namely, the calling party address in this case is the subscriber line number #A; the calling party subaddress is the subaddress #① identifying the ISDN terminal (TE$_{a1}$) 102; the called party address is the subscriber line number #B identifying the destinating subscriber line B; and the called party subaddress is the subaddress #② identifying the destination ISDN terminal TE$_{b2}$) 105. The call setup message (i) further includes, as shown in FIG. 3, (a), a message indicating the type of message. In this case, the type of message indicates that the message (i) is a call setup message.

When the ISDN public network (CO) 101 receives the call setup message, it recognizes that the destination subscriber line is #B and transmits a call setup message which is the same as the call setup message (i) as shown in FIG. 1 to the subscriber line #B (see FIG. 2, ②). Then, the ISDN public network (CO) 101 returns a proceeding message as shown in FIG. 3, (b) to the calling party ISDN terminal (TE$_{a1}$) 102 (see FIG. 2, ③), and then transmits an alert message (see FIG. 3, (C)), received from the called party terminal (TE$_{b2}$) 105, to the calling party terminal (TE$_{a1}$) 102. At the calling party terminal (TE$_{a1}$) 102, in response to the reception of the alert message, a person is informed of the alert state by its being displayed or by a sound (see FIG. 2, ④). On the other hand, at the called party terminal (TE$_{b2}$) 105, simultaneous with the transmission of the alert message to the ISDN public network (CO) 101, a ringing tone is generated (see FIG. 2, ⑤).

The subscriber line #B receives the alert message in accordance with a predetermined ISDN sequence. Since the called party subaddress in this example is #②, only a person at the ISDN terminal TE$_{b2}$) 105 respond to the ringing tone by lifting the receiver off hook so that a connection message as shown in FIG. 3, (d) is transmitted from the terminal (TE$_{b2}$) 105 to the ISDN public network (CO) 101 (see FIG. 2, ⑥). The ISDN public network (CO) 101, when receiving the connection message, transmits it to the calling party terminal (TE$_{a1}$) 102. The calling party terminal TE$_{a1}$) 102 then stops the alert display or sound, and a connection is established between the calling party terminal TE$_{a1}$) 102 and the called party terminal TE$_{b2}$) 105.

Figure 12:
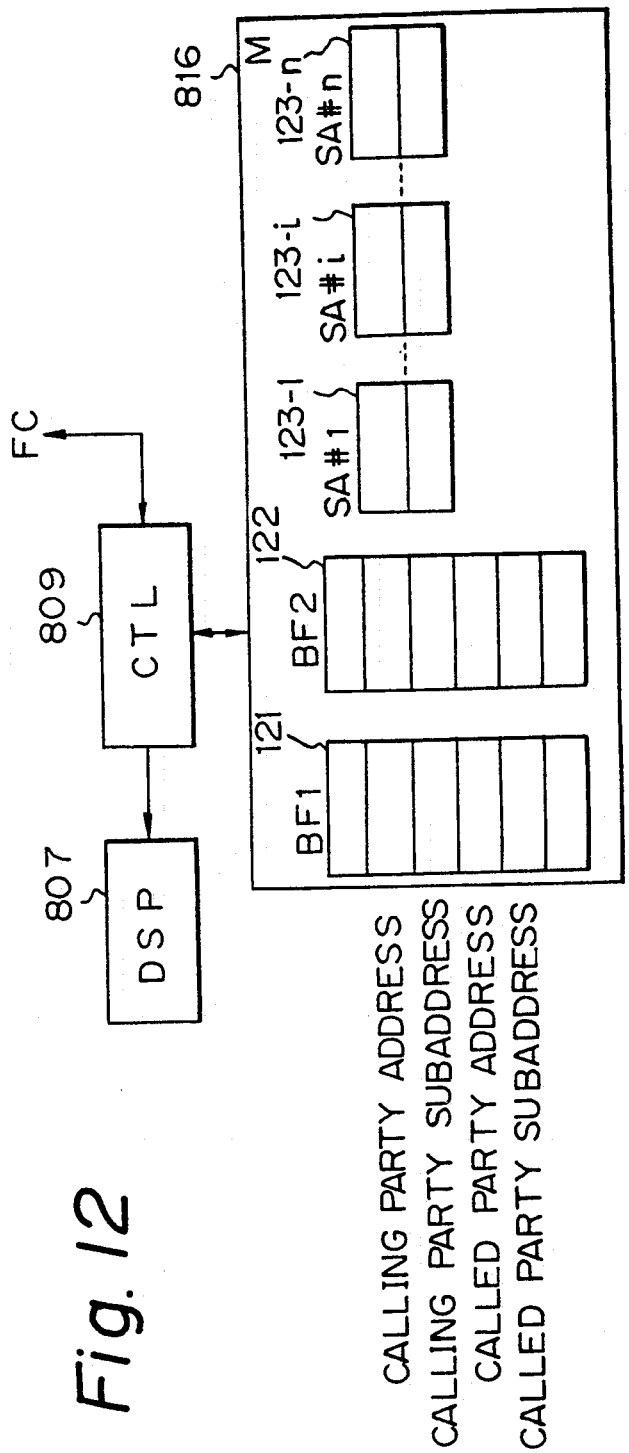
FIG. 12 is a diagram explaining the contents of a memory in the extension terminal according the first embodiment of the present invention.

A disconnection, a release, and a release complete after the end of the communication are carried out by ⑦, ⑧, and ⑨ in FIG. 2. The contents of the messages in the disconnection, release, and release complete are illustrated in FIG. 12, (e), (f), and (g).

In the above-described connection through the ISDN public network, a call back connection is possible as described in the following, and therefore the connection system is very convenient for the user.

Namely, by storing the calling party address and the calling party subaddress received by the called party terminal into a memory unit provided in the called party terminal, and by displaying the stored contents on a display unit or the like, the user, who was away from the called party terminal when the incoming call was terminated at the called party terminal, can immediately recognize the calling party address and subaddress on the display or the like. Therefore, by setting the displayed address and subaddress into a call setup message to be called back from the called party terminal to the original calling party terminal, the user at the called party terminal can call back the person at the original calling party terminal.

In a connecting system between an ISDN public network and ISDN PBX system, however, the above-described call back connection is not so easy, as described in more detail in the following with reference to FIGS. 4 and 5.

Figure 4:
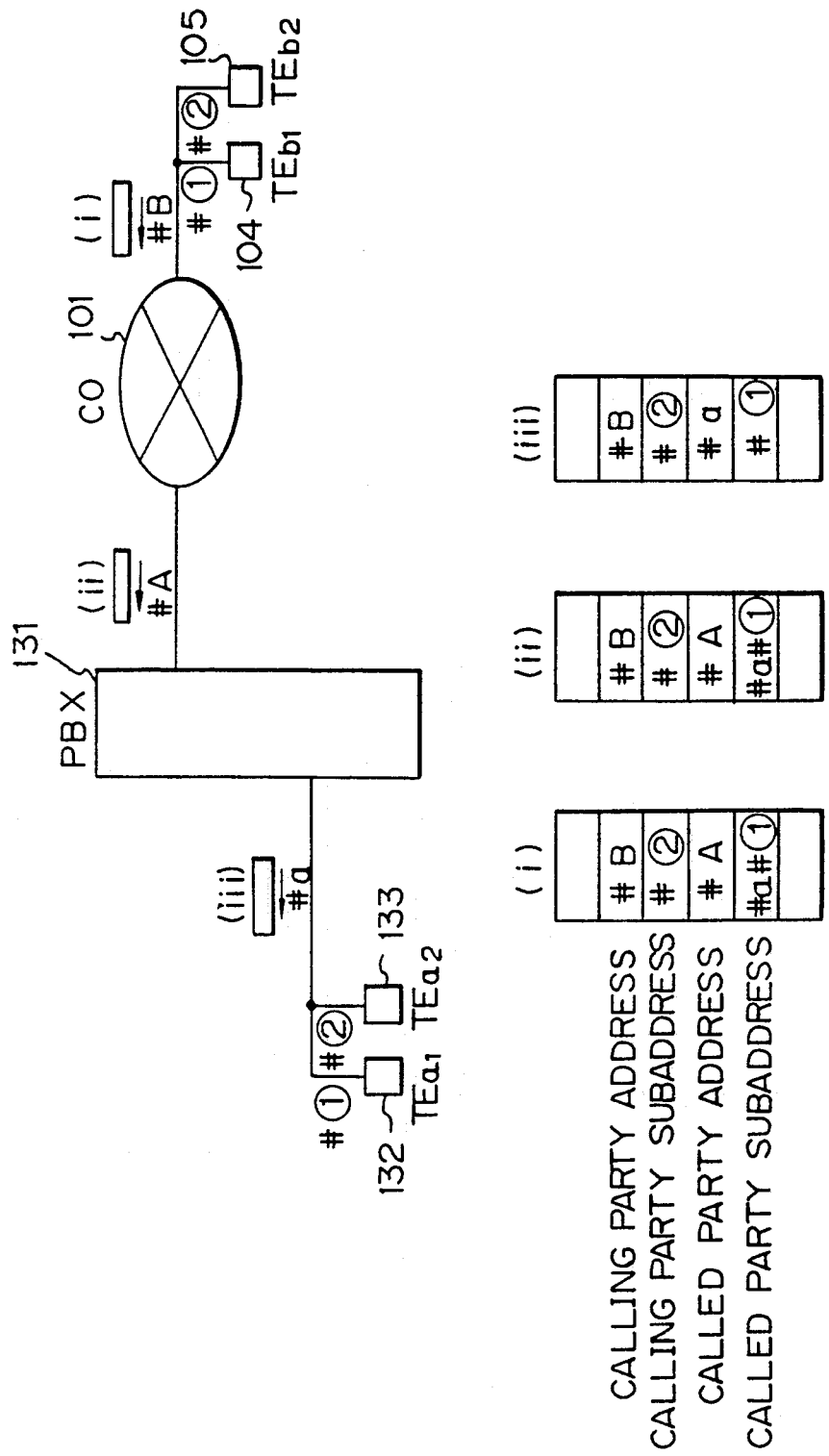
FIG. 4 is a block diagram of a system including a PBX system and an ISDN public network for explaining a conventional call receiving operation by an extension terminal accommodated by the PBX system.

FIG. 4 is a block diagram of a system including a PBX system and an ISDN for explaining a conventional call receiving operation by an extension terminal accommodated by the PBX system. Referring to FIG. 4, an example will be described in which a call is effected from a terminal (TE$_{b2}$) 105 connected to an ISDN public network (CO) 101 to an extension terminal (TE$_{a1}$) 132 accommodated through an extension line #a by a PBX system. In the figure, the subscriber line number of the PBX 131 is #A, and the extension line number of the PBX is #a. In a ISDN PBX, eight extension terminals at the maximum can be connected to the extension line #a. The public network (CO) 101, the terminal (TE$_{b1}$) 104, and the terminal (TE$_{b2}$) 105 are the same as those shown in FIG. 1.

First, when a person takes the ISDN terminal (TE$_{b2}$) 105 off hook to call the extension terminal (TE$_{a1}$) 132, the call setup message (i) as illustrated in FIG. 1 is setup, and then the call setup message (i) is sent to the ISDN public network (CO) 101. Namely, the calling party address in this case is the subscriber line number #B; the calling party subaddress is the subaddress #② for identifying the ISDN terminal (TE$_{b2}$) 105; the called party address is the subscriber line number #A for identifying the destination subscriber line A connected between the PBX 131 and the ISDN public network 101; and the called party subaddress is #a#① which is a combination of a number #a of the called party extension line accommodated by the PBX 131 and a number #① of the called party extension terminal accommodated by the PBX 131. In FIG. 4 also, the call setup message is represented by (i). The contents of the call setup message are similar to that shown if FIG. 3, but the called party subaddress is different as can be seen from the above description. When the ISDN public network (CO) 101 receives the call setup message (i), it recognizes that the destination subscriber line is #A and transmits a call setup message (ii) which is the same as the call setup message (i) to the PBX 131.

The PBX 131 then analyzes the called party subaddress and takes out from the subaddress the extension line number #a to form a call setup message (iii) having the called party address #a and a called party subaddress #① which is obtained by deleting the extension line number #a from the called party subaddress received from the ISDN public network (CO) 101. The PBX 131 then transmits the thus obtained called party subaddress #① to the extension line a.

The extension terminal (TE$_{a1}$) 132 compares its own address with the called party subaddress #①, and if they coincide, it generates a ringing tone. When a person who hears the ringing tone takes the receiver off hook, a connection is established between the terminal (TRE$_{b2}$) 105 and the extension terminal (TE$_{a1}$) 132.

Figure 5:
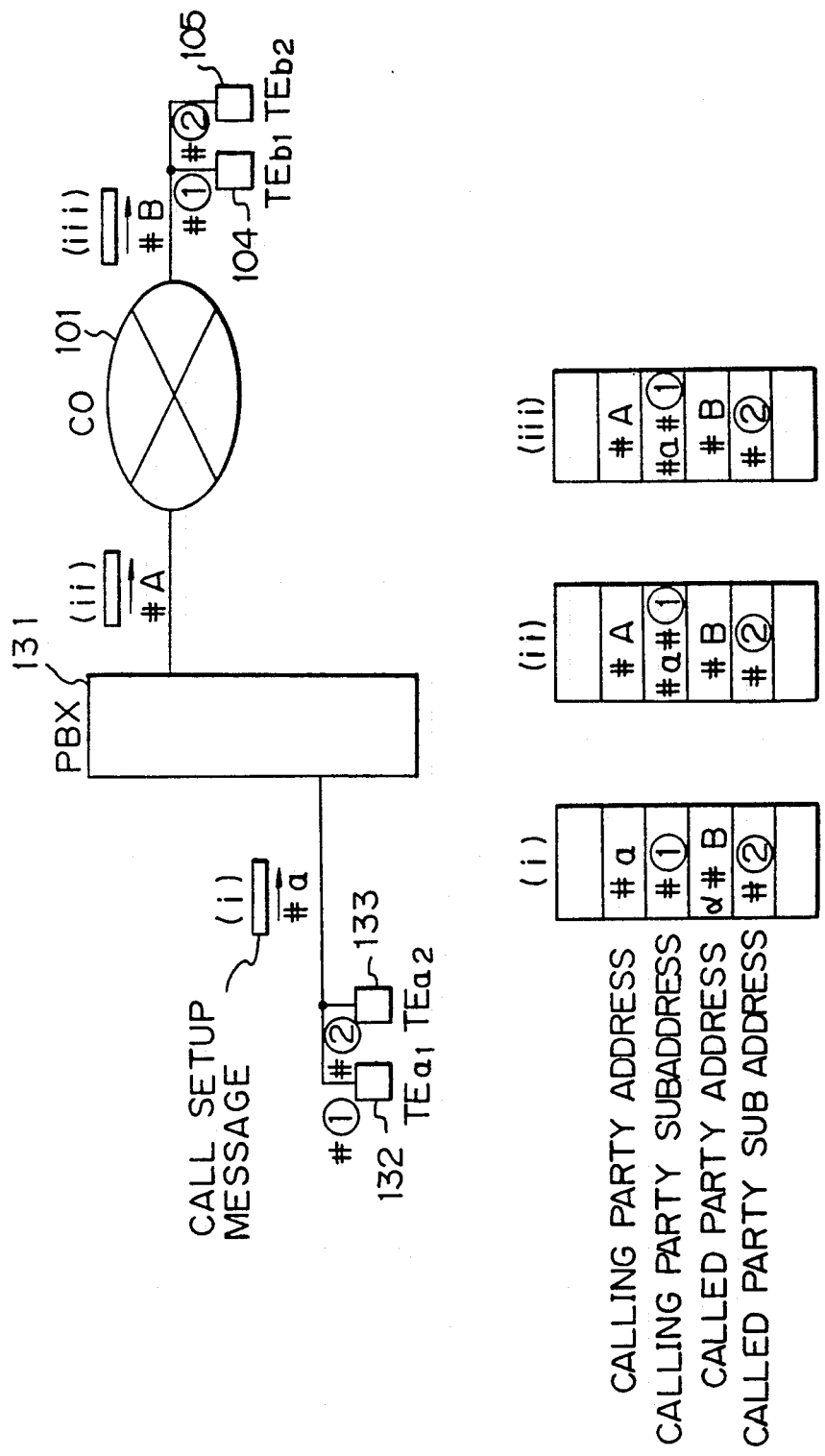
FIG. 5 is a block diagram of a system including a PBX system and an ISDN public network for explaining a conventional call back operation from an extension terminal accommodated by the PBX system.

FIG. 5 is a block diagram of a system including a PBX system and an ISDN for explaining a conventional call originating operation by an extension terminal accommodated by the PBX system. Referring to FIG. 5, an example will be described in which a call is effected from an extension terminal (TE$_{a1}$) 132 accommodated by the PBX 131 through the ISDN public network (CO) 101 to an ISDN terminal 105. In this case, first, the extension terminal (TE$_{b2}$) 132 sets a setup message (i) and transmits it to the PBX 131. The setup message (i) in this case has, as illustrated in the figure, a calling party address #a which is the extension line number; a calling party subaddress is the subaddress #① for identifying the extension terminal (TE$_{a1}$) 132; a called party address α#B which is a combination of a line accessing number α for identifying the communication line A connected between the PBX 131 and the ISDN public network (CO) 101 and the subscriber line number #B for identifying the destination terminal (TE$_{b2}$) 105; and a called party subaddress #② for identifying the destination terminal (TE$_{b2}$) In FIG. 4 also, the call setup message is represented by (i).

When the PBX 131 receives the call setup message (i) from the extension terminal (TE$_{a1}$) 132, the PBX 131 analyzes the called party address in the call setup message. If the line accessing number α is found in the call setup message, the PBX 131 recognizes that the destination terminal is not an extension terminal accommodated by the PBX 131 but is a terminal connected to the ISDN public network (CO) 101. The PBX 131 then edits a call setup message (ii) and transmits it to the ISDN public network (CO) 101. Namely, the call setup message (ii) has, in this case, a called party address #B which is the number of the subscriber line B connected to the ISDN terminal (TE$_{b2}$) 105 and which is obtained by subtracting the line accessing number α from the called party address α#B received from the extension line; a called party subaddress #② for identifying the terminal (TE$_{b2}$) 105 and which is from the extension line; a calling party address #A which is the subscriber line number of the communication line connected between the PBX 131 and the ISDN public network (CO) 101; and a calling party subaddress #a #① which is a combination of the calling party subaddress #① received from the extension line and the number #a of and extension line connected to the calling party extension terminal (TE$_{a1}$) 132 accommodated by the PBX 131. Thus, from the extension terminal connected to the extension line accommodated to the PBX 131, the ISDN terminal (TE$_{b2}$) 105 connected to the subscriber line B which is connected to the ISDN public network (CO) 101 can be called. When the terminal (TE$_{b2}$) 105 responds to the call, the connection between the extension terminal (TE$_{a1}$) 132 and the ISDN terminal (TE$_{b2}$) 105 is established.

There is, however, a problem in the above-mentioned conventional connecting system, as briefly mentioned before. Namely, when a call is effected from the ISDN terminal (TE$_{b2}$) 105 to the extension terminal (TE$_{a1}$) 132 as described with reference to FIG. 4, the extension terminal (TE$_{a1}$) 132 only receives the calling party address #B. It should be noted that another extension terminal accommodated to the PBX 131 may also have the same address #B as the above-mentioned calling party address #B. Therefore, the called party extension terminal (TE$_{a1}$) 132 can not identify whether the received calling party address is from a terminal connected to the ISDN public network or from another extension terminal accommodated by the PBX system. Therefore, if the user is away from the called party extension terminal when a call is terminated at the extension terminal, and after the termination of the call, if the user wants to call back the person at the calling party terminal, the user cannot effect the call back of the calling party terminal because the user does not know the line access number #A for accessing the communication line connected between the PBX system and the ISDN public network.

Now an embodiment of the present invention will be described with reference to FIGS. 6 to 14.

Figure 6:
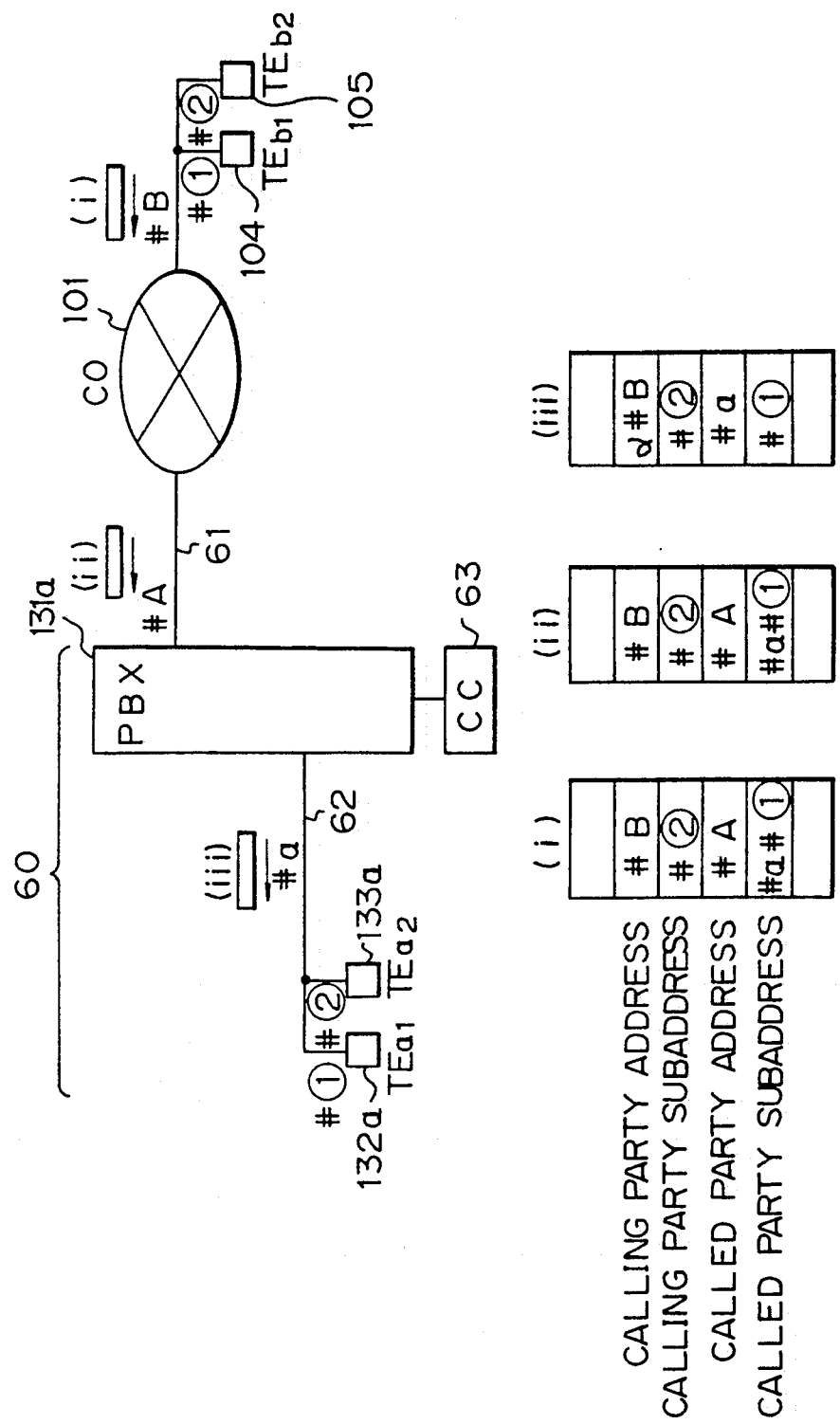
FIG. 6 is a block diagram showing a connecting system between an ISDN public network and a PBX system for explaining the principle of a first embodiment of the present invention.

FIG. 6 is a block diagram showing a connecting system between an ISDN and a PBX system for explaining the principle of a first embodiment of the present invention. In FIG. 6, PBX system 60 is connected through a communication line 61 to an ISDN public network (CO) 101. The PBX system 60 includes a switching network 131a for switching between the communication line 61 connected to the ISDN public network 131a and an extension line 62 accommodated to the PBX system 60, a control unit (CC) 63 connected to the switching network, for controlling the switching operation of the switching network, and an extension terminal ($TE_{a1}$) 132a accommodated by the PBX system 60 and connected through the extension line 62 to the switching network 131a. The control unit (CC) 63 operates to add a line accessing number $\alpha$ to a calling party address #B in an incoming call information (ii) from the ISDN public network (CO) 101 and received by the switching network 131a through said communication line 61. The line accessing number $\alpha$ can be used when a call is originated from the extension terminal ($TE_{a1}$) 132a through the switching network 131a and through the communication line 61 to the ISDN public network (CO) 101. The control unit 63 forms an information $\alpha$#B provided with the line accessing number $\alpha$ and transmits the information $\alpha$#B to the extension terminal, when the incoming call information (ii) from the communication line is received by the switching network 131a.

Namely, in FIG. 6, different from the conventional constitution shown in FIG. 4, to the calling party address information #B in the call setup message (ii) transmitted from the ISDN public network (CO) 101 to the switching network 131a, the line accessing number $\alpha$ is provided to form a new calling party address, and the new calling party address is inserted into a calling party address section in a call setup message (iii) to be transmitted from the switching network 131a to the extension terminal ($TE_{a1}$) 132a. The other portions except for the above mentioned difference are the same as the portions in the conventional constitution shown in FIG. 4. That is, the subscriber line number of the switching network 131a is #A, and the extension line number of the extension line 62 accommodated by the PBX system 60 is #a. In a PBX, system eight extension terminals at the maximum can be connected to the extension line 62. The public network (CO) 101, the terminal ($TE_{b1}$) 104, and the terminal ($TE_{b2}$) 105 are the same as those shown in FIG. 4.

First, when a person takes the ISDN terminal ($TE_{b2}$) 105 off hook to call the extension terminal ($TE_{a1}$) 132a, the call setup message (i) as illustrated in FIG. 6 is setup, and then the call setup message (i) is sent to the ISDN public network (CO) 101. Namely, the calling party address in this case is the subscriber line number #B; the calling party subaddress is the subaddress #② for identifying the ISDN terminal ($TE_{b2}$) 105; the called party address is the subscriber line number #A for identifying the destinating subscriber line 61 connected between the PBX switching network 131a and the ISDN public network (CO)101; and the called party subaddress is #a #① which is a combination of a number #a of the called party extension line 62 accommodated by the PBX system 60 and a number #① of the called party extension terminal ($TE_{a1}$) 132a accommodated by the PBX system 60. The call setup message (i) is the same as that shown in FIG. 4.

When the ISDN public network (CO) 101 receives the call setup message (i), it recognizes that the destination subscriber line is #A and transmits a call setup message (ii) which is the same as the call setup message (i) to the switching network 131a.

The PBX switching network 131a then analyzes the called party subaddress and takes out from the subaddress the extension line number #a to form a call setup message (iii) having the called party address #a and a called party subaddress #① which is obtained by deleting the extension line number #a from the called party subaddress received from the ISDN public network (CO) 101. The PBX switching network 131a then transmits the thus obtained called party subaddress #1 to the extension line 62.

The extension terminal ($TE_{a1}$) 132a compares its own address with the called party subaddress #①, and if they coincide, the terminal 132a generates a ringing tone. When a person who hears the ringing tone takes the receiver off hook, a connection is established between the terminal ($TE_{b2}$) 105 and the extension terminal ($TE_{a1}$) 132a.

Since the calling party address in the setup message (iii) received by the extension terminal ($TE_{a1}$) 132a includes the line access number $\alpha$ for identifying the communication line connected between the switching network 131a and the ISDN public network (CO) 101, and by displaying the line number $\alpha$ on a display for example, the user at the extension terminal ($TE_{a1}$) 132a can recognize that the incoming call is not a call from another extension terminal accommodated by the PBX system 60 but is a call from a terminal connected to the ISDN public network 101.

To call back from the called party extension terminal ($TE_{a1}$) 132a to the calling party terminal ($TE_{b2}$) 105, it is sufficient to send back a message, having a destination address and a destination subaddress which are respectively the calling party address $\alpha$#B and the calling party subaddress #② in the call setup message (iii), from the called party extension terminal ($TE_{a1}$) 132a to the calling party terminal ($TE_{b2}$) 105.

The communication line 61 is formed by a central office line connected between the ISDN public network (CO) 101 and the switching network 131a.

The communication line 61 may alternatively be a private line connected between the ISDN public network (CO) 101 and the switching network 131a.

The incoming call information (ii) is a call setup message.

The extension terminal ($TE_{a1}$) 132a includes a display unit for displaying the line accessing number $\alpha$ and the calling party address #B when the extension terminal ($TE_{a1}$) 132a receives an incoming message (iii) transmitted from the switching network 131a.

The incoming message (iii) is transmitted by the use of one channel in a plurality of channels in a subscriber line connected between the switching network 131a and the extension terminal $TE_{a1}$) 132a.

The plurality of channels are 2B+D channels.

The channel for transmitting the incoming message (iii) is control channel D in the 2B+D channels.

The extension terminal $TE_{a1}$) 132a includes a storage unit for storing the incoming message (iii), a plurality of function keys for instructing predetermined functions, and a terminal control unit operatively connected to the storing unit, the function keys, and the display unit, for controlling the storing unit, the display unit, and the function keys. By using the line accessing number in the calling party information in the incoming message (iii) read from the storing unit, a call back can be automatically carried out from the destinating extension terminal ($TE_{a1}$) 132a to the calling party terminal.

The storage unit for storing the incoming message has a plurality of storage areas corresponding to the function keys.

The extension terminal $TE_{a1}$) 132a comprises a detecting unit for detecting one of the function keys being pushed, a reading unit for reading the line accessing number $\alpha$ and the calling party address information #B stored in a memory area corresponding to the pushed function key, and a transmitting unit for transmitting the read line accessing number α and the read calling party address information #B to the switching network 131a. When a call back is carried out from the extension terminal (TE$_{a1}$) 132a to the calling party which previously called the extension terminal TE$_{a1}$) 132a, the switching network 131a receives the line accessing number α and the calling party address information #B, and transmits them to the calling party corresponding to the line accessing number α.

During a communication between the extension terminal TE$_{a1}$) 132a and the calling party through the switching network 131a, when the extension terminal (TE$_{a1}$) 132a detects that one of the function keys is pushed, the calling party address information temporarily stored in the storage unit is transferred from a temporary storage memory area to a memory area corresponding to the pushed key.

When a call is to be originated from the extension terminal (TE$_{a1}$) 132a, if the detecting unit detects that the function key is pushed, the calling party address is read from the memory area corresponding to the specified function key and transmitted to the calling party.

The extension terminal (TE$_{a1}$) 132a identifies a line number provided to the calling party information in the incoming message received by the switching network 131a, and, depending on whether the identified line number is for an extension line accommodated by the PBX system or for an external communication line connected between the switching network 131a and the ISDN public network (CO) 101, the extension terminal (TE$_{a1}$) 132a generates different ringing tones.

Figure 7:
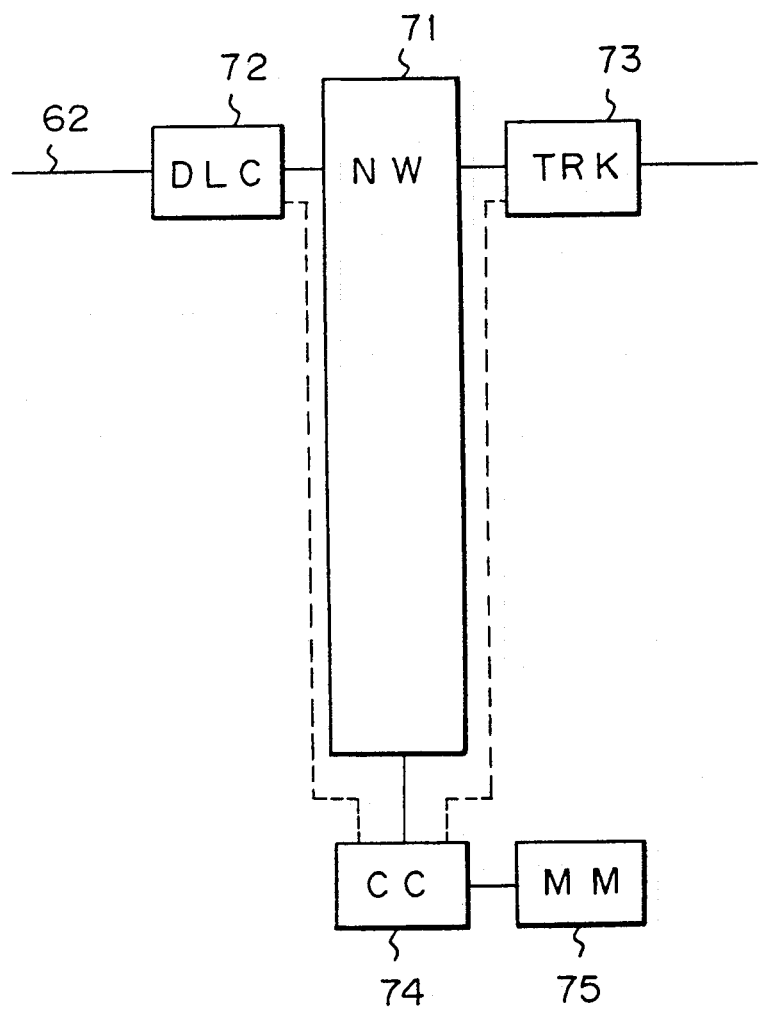
FIG. 7 is a block diagram showing the construction of a PBX system in the first embodiment of the present invention.

FIG. 7 is a block diagram showing the detailed construction of the switching network 131a in the system shown in FIG. 6. In the figure, 71 is a network (NW), 72 is a digital extension line circuit (DLC) or in other words a line circuit for PBX terminals, 73 is a communication line trunk (TRK), 74 is a common control unit (CC) which is the same as the control unit (CC) 63 in FIG. 6, and 75 is a main memory (MM).

The common control unit (CC) 74 receives a call setup message from the communication line trunk (TRK) 73, provides the line accessing number α to the calling address #B in the received call setup message, carries out other editing processes, and transmits the call setup message through the digital extension line circuit (DLC) 72 to the extension line 62.

Figure 8:
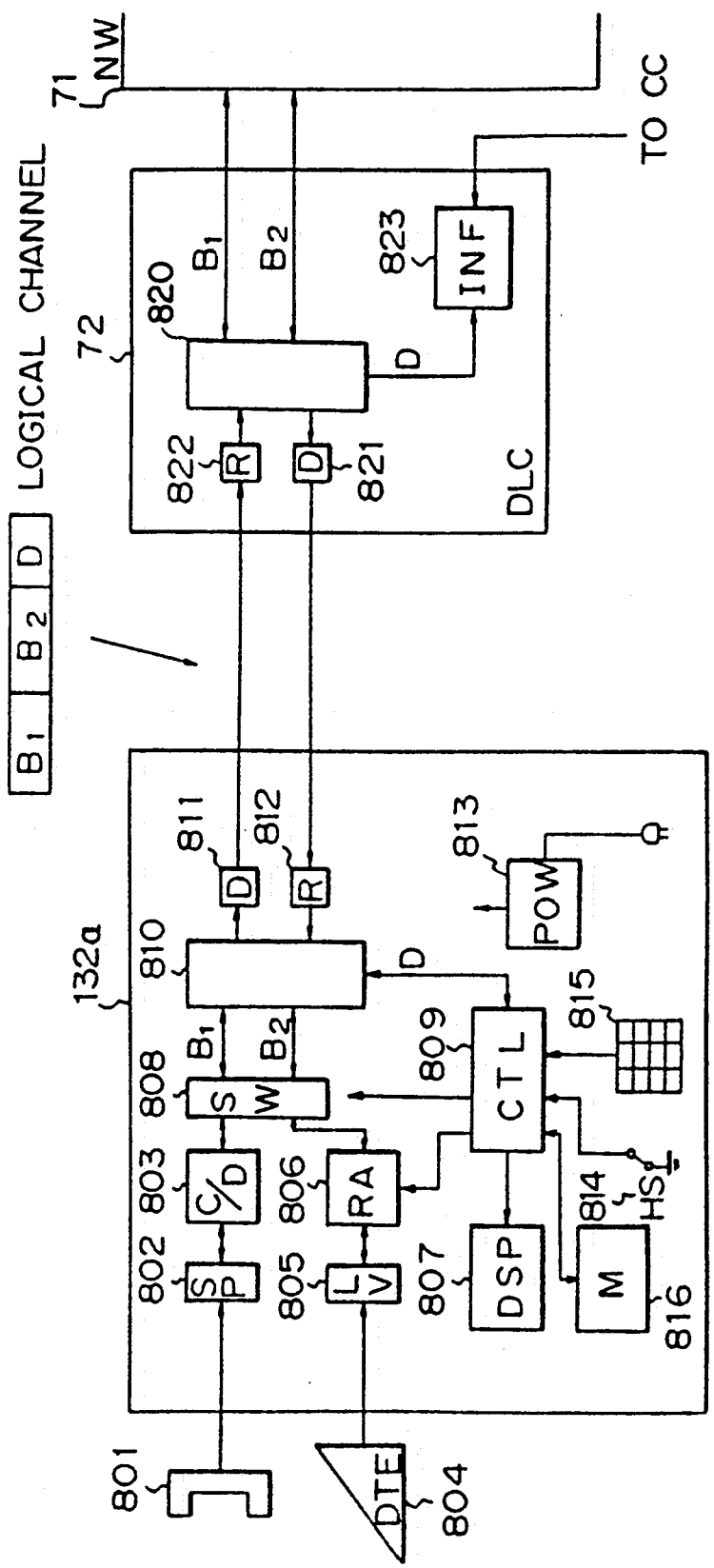
FIG. 8 is a block diagram showing in detail an extension terminal accommodated by the PBX system and a digital line circuit (DLC) in the PBX system according to the first embodiment of the present invention.

FIG. 8 is a block diagram showing the constitution of the extension terminal (TE$_{a1}$) 132a and the digital extension line circuit (DLC) 72. In the extension terminal TE$_{a1}$) 132a in the figure, 801 is a telephone hand set (H), 802 is a speech path circuit (SP), 803 is a code (C/D), 804 is a data terminal (DTE), 805 is a level converter (LV), 806 is a data speed converter (RA), 807 is a display unit (DSP), 808 is a switch (SW), 809 is a controller (CTL), 810 is a frame assembling/disassembling part (FC), 811 is a driver (DV), 812 is a receiver (R), 813 is a power source (POW), 814 is a hook switch (HS), 815 is a function key, and 816 is a memory.

On the display unit (DSP) 807, the calling party address from the switching network (NW) 71 is directly displayed. The calling party address from the switching network (NW) 71 is also stored in the memory 816, and its contents can be displayed later on the display unit (DSP) 807. By seeing the number on the display unit (DSP) 807, the user can determine whether the incoming call is from another extension terminal accommodated to the PBX system 60 or from a terminal connected to the ISDN public network 101. Further, a call back can be carried out to the original calling party by operating the key 815 so as to form a destination address and a destination subaddress which are respectively the same as the calling party address and the calling party subaddress being displayed on the display part (DSP) 807.

In the digital extension line circuit (DLC) 72, 820 is a frame assemble/disassemble circuit (FC), 821 is a driver (D), 822 is a receiver (R), and 823 is an interface part (INF).

The line between the digital extension line circuit (DLC) 72 and the extension terminal (TE$_{a1}$) 132a is a digital subscriber line referred to as 2B+D. Here, the B channels are data channels and the D channel is a control signal channel.

Figure 9:
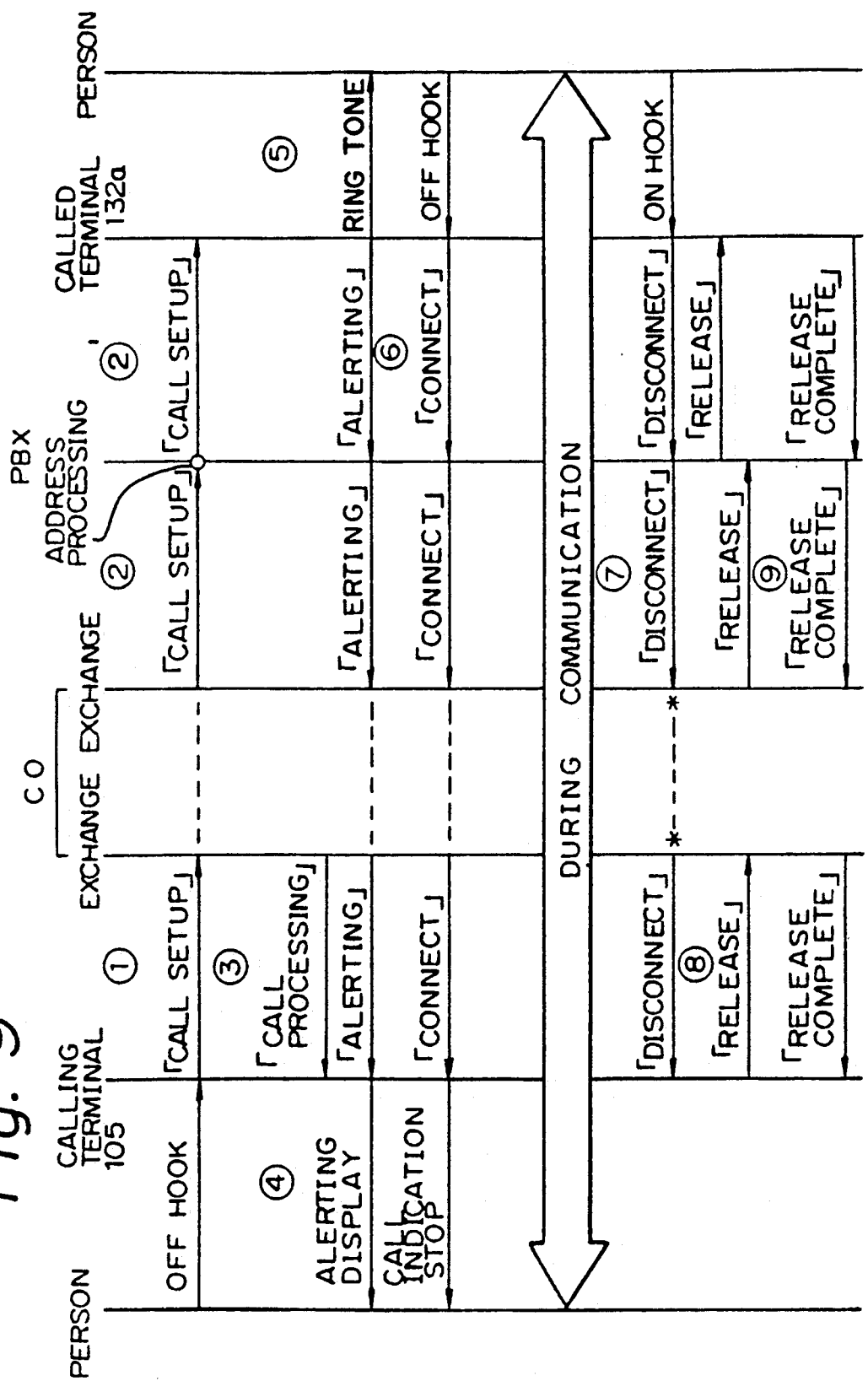
FIG. 9 is a diagram showing a call connection sequence between the ISDN public network and the PBX system in the first embodiment of the present invention.

FIG. 9 is a diagram showing a call connection sequence between the ISDN public network (CO) 101 and the PBX network. In FIG. 9, the difference from the conventional public network sequence shown in FIG. 2 resides only in that there is a PBX switching network between the called party extension terminal and the ISDN public network. In the PBX system 60, the calling party address received from the ISDN public network is processed and described before and the call setup message is then transmitted to the called party extension terminal.

Namely, assume that, in FIG. 6, a call is originated from the ISDN terminal (TE$_{b2}$) 105 to the extension terminal TE$_{a1}$) 132a. First, when a person takes the ISDN terminal (TE$_{b2}$) 105 off hook to call the extension terminal TE$_{a1}$) 132a, the call setup message (i) as illustrated in FIG. 6 is setup, and then the call setup message (i) is sent to the ISDN public network (CO) 101 (see FIG. 9, ①). When the ISDN public network (CO) 101 receive the call setup message, it recognizes that the destination subscriber line is the communication line 61 and transmits a call setup message which is the same as the call setup message (i) as shown in FIG. 6 to the subscriber line 61. The PBX switching network 131a receives the call setup message (ii) through the communication line 61, and forms the call setup message (iii) as shown in FIG. 6. The call setup message (iii) is then sent to the extension terminal (TE$_{a1}$) 132a (see FIG. 9, ②). Then, the ISDN public network (CO) 101 returns a call proceeding message (B) as shown in FIG. 3 to the calling party ISDN terminal (TE$_{B2}$) 105 (see FIG. 9, ③), and then transmits an alert message (C) (see FIG. 3), received from the called party extension terminal (TE$_{b2}$) 132a, to the calling party terminal (TE$_{b2}$) 105. At the calling party terminal (TE$_{b2}$) 105, in response to the reception of the alert message, a person is informed of the alert state by displaying it or by sound (see FIG. 9, ④). On the other hand, at the called party extension terminal (TE$_{a1}$) 132a, simultaneous with the transmission of the alert message to the ISDN public network (CO) 101, a ringing tone is generated (see FIG. 9, ⑤).

The communication line 61 receives the alert message in accordance with a predetermined ISDN sequence. Since the called party subaddress in this example is #②, only a person at the extension terminal (TE$_{a1}$) 132a responds to the ringing tone by taking the receiver off hook, so that a connection message (d) as shown in FIG. 3 is transmitted from the extension terminal (TE$_{a1}$) 132a through the switching network 131a to the ISDN public network (CO) 101 (see FIG. 9, 6). The ISDN public network (CO) 101, when receiving the connection message, transmits it to the calling party terminal (TE$_{b2}$) 105. The calling party terminal (TE$_{b2}$)

105 then stops the alert display or sound, and a connection is established between the calling party terminal (TE$_{b2}$) 105 and the called party extension terminal (TE$_{a1}$) 132a.

A disconnection, a release, and a release completion after the end of the communication are carried out by 7, 8, and 9 in FIG. 9. The contents of the messages in the disconnection, release, and release completion are illustrated in FIG. 3, (e), (f), and (g).

A call back connection according to the embodiment of the present invention can be effected as follows.

Namely, by storing the calling party address including the line accessing number α and the calling party subaddress received by the called party terminal, in the memory unit (M) 816 provided in the called party terminal, and by displaying the stored contents on the display unit (DSP) 807 or the like, the user, who was away from the called party terminal when the incoming call is terminated at the called party terminal, can immediately recognize whether the calling party is from the ISDN public network or from another extension terminal accommodated by the PBX system. So, by setting the displayed address including the line accessing number α and subaddress into a call setup message to be transmitted from the called party terminal to the original calling party terminal, the user at the called party terminal can call back the person at the original calling party terminal.

Figure 10:
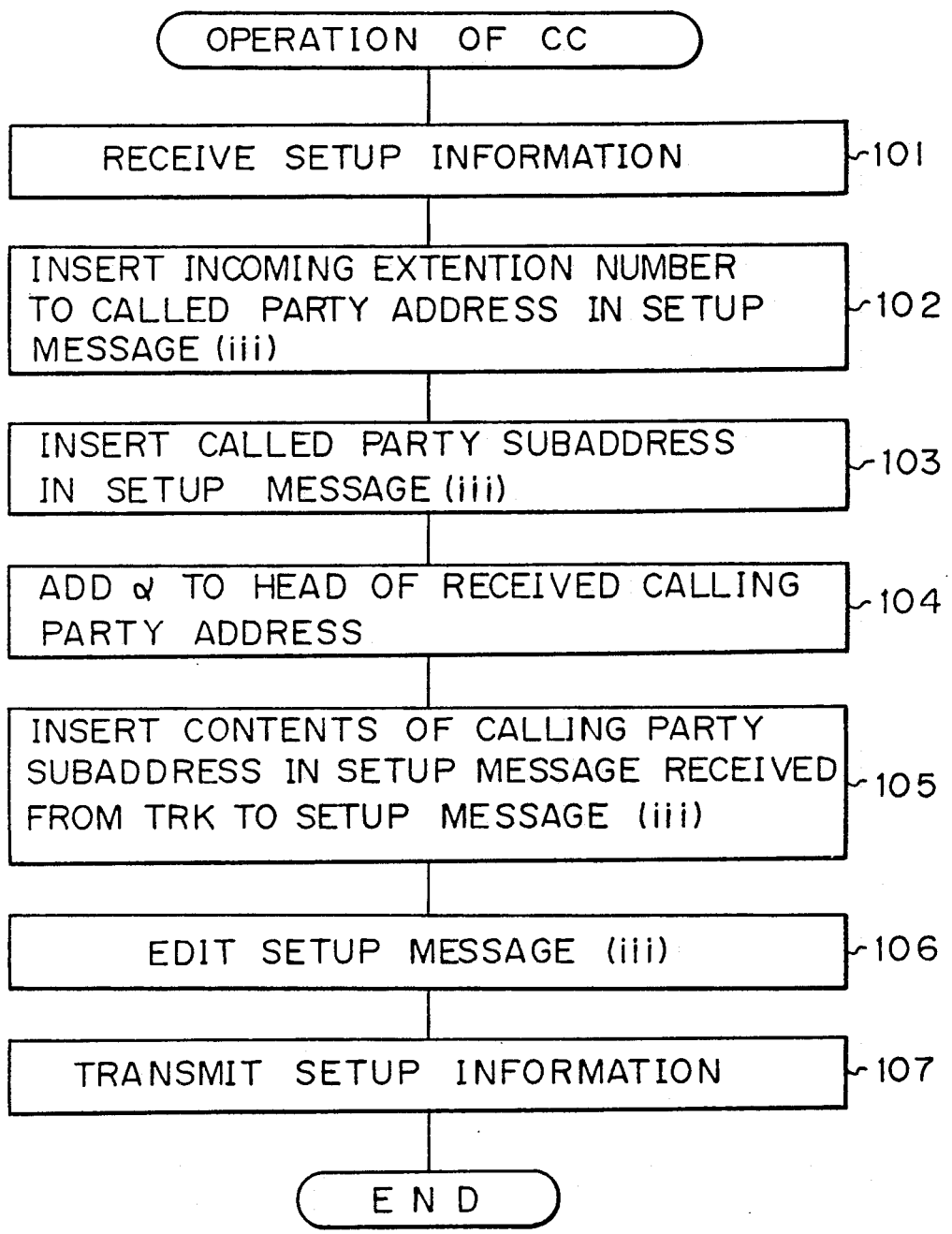
FIG. 10 is a flowchart for explaining the operation of the control unit connected to a PBX network according to the first embodiment of the present invention.

FIG. 10 is a flowchart explaining the operation of the common control unit (CC) 74 connected to the switching network 131a as shown in FIG. 7. In FIG. 10, at step 101 the common control unit (CC) 74 receives a call setup message, such as the call setup message (ii), from the communication line trunk (TRK) 73.

At step 102, from the called party subaddress #a # ① in the call setup message received from the communication line trunk (TRK) 73, the called party extension line number #a is taken out and the taken out number #a is inserted as a called party address into the setup message (iii) to be transmitted to the called party digital extension line circuit (DLC) 72.

At step 103, the called party subaddress # ① in the received call setup message (ii) is inserted as a called party subaddress into the setup message (iii) to be transmitted to the called party digital extension line circuit (DLC) 72.

At step 104, the line accessing number α is added to the head of the calling party address #B received from the communication line trunk (TRK) 73, and the combined number α#B is inserted as a calling party address into the setup message (iii) to be transmitted to the called party digital extension line circuit (DLC) 72.

At step 105, the calling party subaddress # ② in the call setup message received from the communication line trunk (TRK) 73 is inserted as a calling party subaddress into the setup message (iii) to be transmitted to the called party digital extension line circuit (DLC) 72.

At step 106, the other processes necessary for editing the setup message (iii) are carried out.

Finally, at step 107, the setup message (iii) is transmitted to the called party digital extension line circuit (DLC) 72.

Thus, the transmission of the call setup message is completed.

Figure 11:
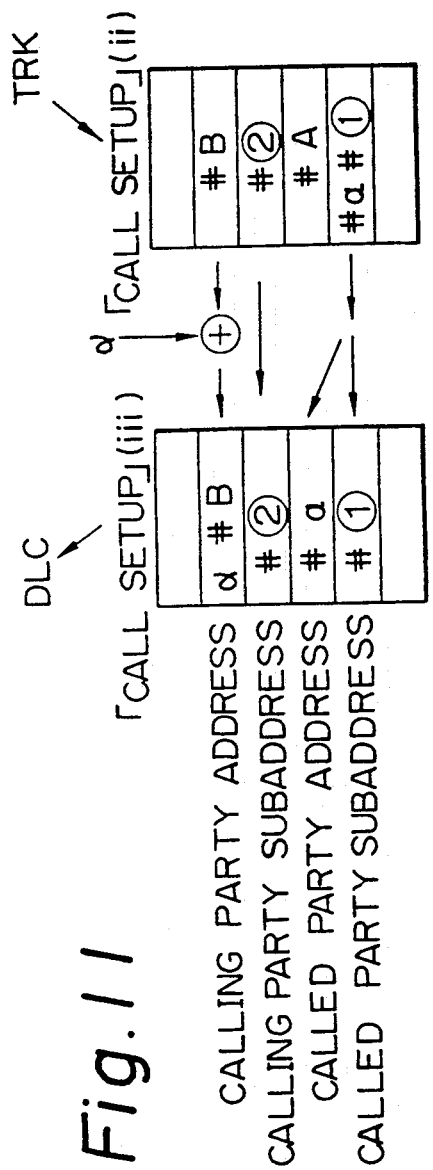
FIG. 11 is a diagram explaining addresses in a main memory in the PBX system according to the first embodiment of the present invention.

FIG. 11 is a diagram explaining the processes in the main memory (MM) 75 shown in FIG. 7. From the figure, it can be seen that the call setup message (ii) from the communication line trunk (TRK) 73 is changed to the call setup message (iii) in the PBX system, and is transmitted to the called party digital extension line circuit (DLC) 72.

FIG. 12 is a diagram explaining the contents of the memory (M) 816 in the extension terminal (TE$_{a1}$) 132a shown in FIG. 8. As shown in the figure, the memory (M) 816 includes two buffer memories (BF1) 121 and (BF2) 122, and a plurality of saving memories (SA#1 to SA#n) 123 -1 to 123 -n for saving data to be used for effecting the call back functions. The buffer memory (BF1) 121 stores the received setup message, and the buffer memory (BF2) 122 stores a setup message used for the call back operation. The saving memories (SA#1 to SA#n) 123 -1 to 123 -n respectively correspond to the function keys.

Figure 13:
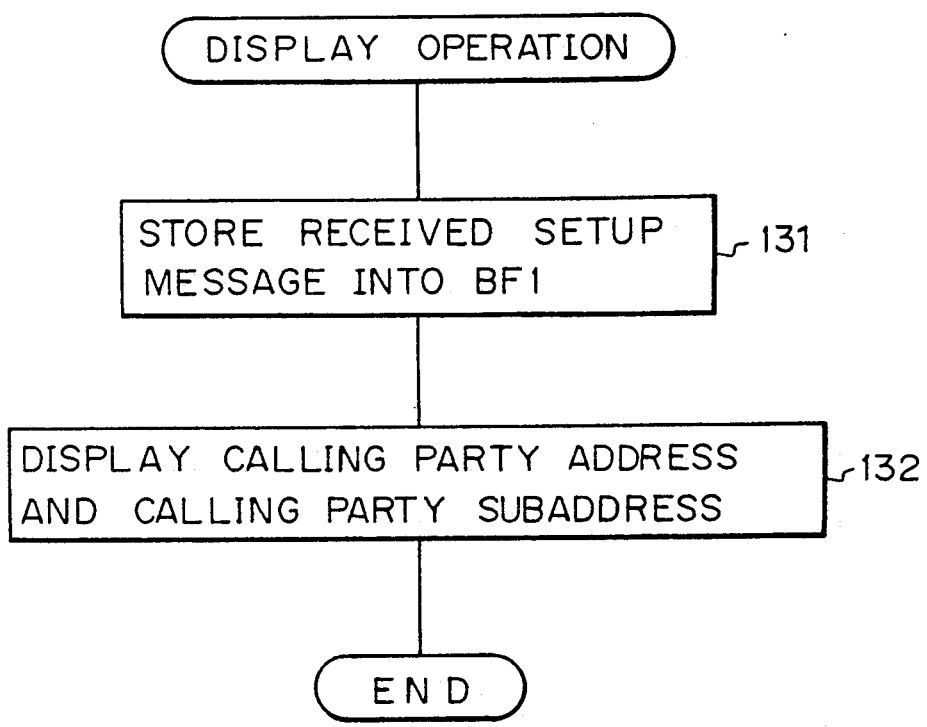
FIG. 13 is a flowchart for explaining a display operation of a calling party address according to the first embodiment of the present invention.

FIG. 13 is a flowchart explaining the display operation by the controller (CTL) 809 shown in FIG. 12. Referring to FIG. 13, at step 131, the controller (CTL) 809 receives the call setup message (iii) from the switching network (NT) 71 and stores it into the buffer memory (BF1) 121. Then at step 132, the calling party address and the calling party subaddress in the call setup message are read from the buffer memory (BF1) 121 and are displayed on the display unit (DSP) 807. From the displayed date, the user can recognize whether the calling party is from the ISDN public network or from another extension terminal accommodated by the PBX system.

Figure 14:
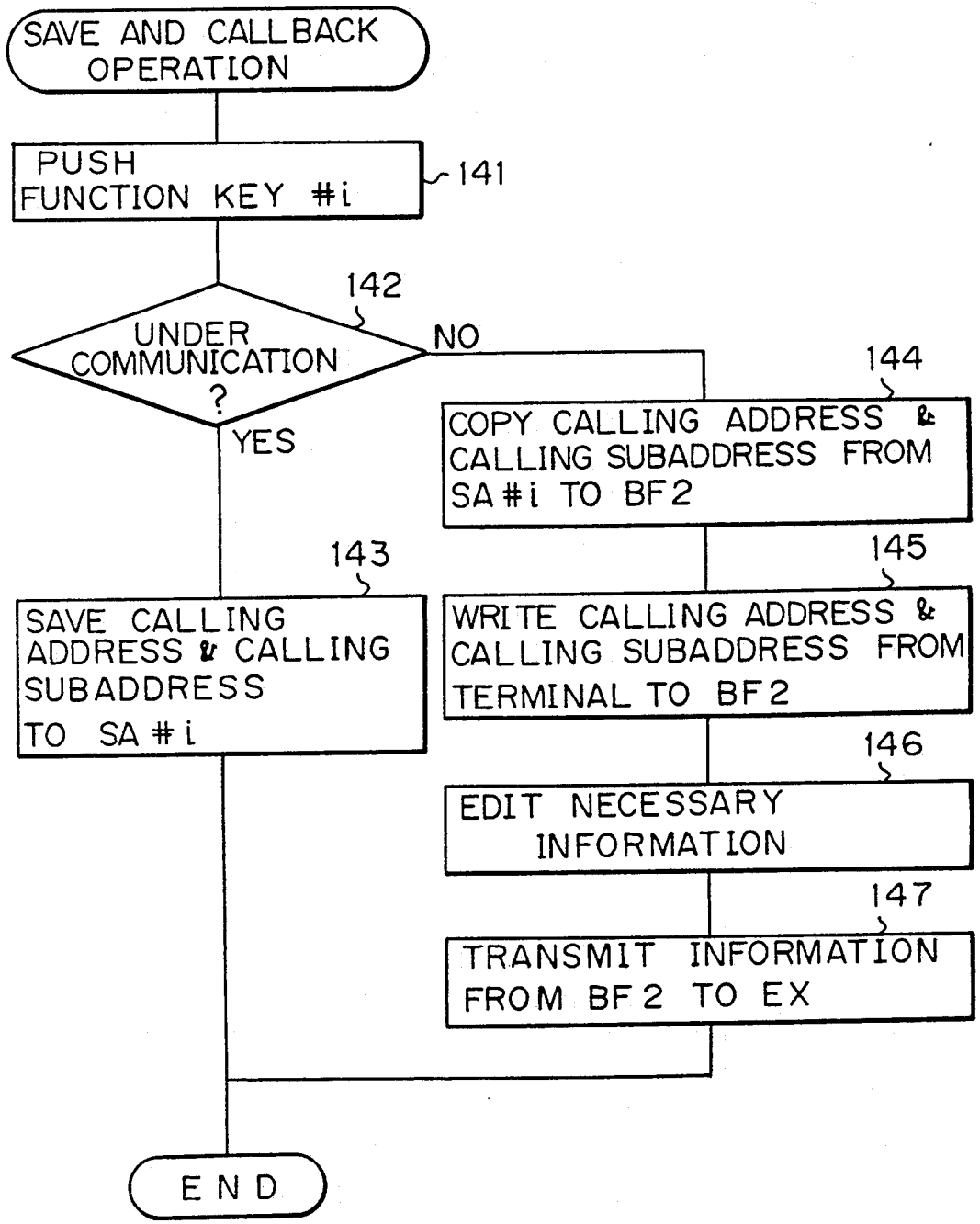
FIG. 14 is a flowchart for explaining a saving and call back operation according to the first embodiment of the present invention.

FIG. 14 is a flowchart explaining a save and a call back operation by the controller (CTL) 809 shown in FIG. 12. Referring to FIG. 14, when a function key #i in the key 815 is pushed at step 141, a discrimination is made of whether or not the extension terminal 132a is under communication at step 142.

If it is under communication, at step 143, the calling party address and the calling party subaddress stored in the buffer (BF1) 121 are saved into the saving memory (SA#i) 123 -i corresponding to the pushed function key, and the process is finished.

If the extension terminal 132a is not under communication at step 142, then, at step 144, the calling party address and the calling party subaddress stored in the saving memory (SA#i) 123 -i are copied to the buffer memory (BF2) 122.

Then, at step 145, the address and the subaddress of the extension terminal (TE$_{a1}$) 132a are stored as a calling party address and a calling party subaddress into the buffer memory (BF2) 122 for the call back operation.

Then, at step 146, necessary information as a call setup message for the call back operation is edited.

At step 147, the data in the buffer memory (BF2) 122 is transmitted through the switching network 71 and the ISDN public network (CO) 101 to the original calling party terminal (TE$_{b2}$) 105.

Thus, the call back function can be effected according to the first embodiment of the present invention.

Figure 15:
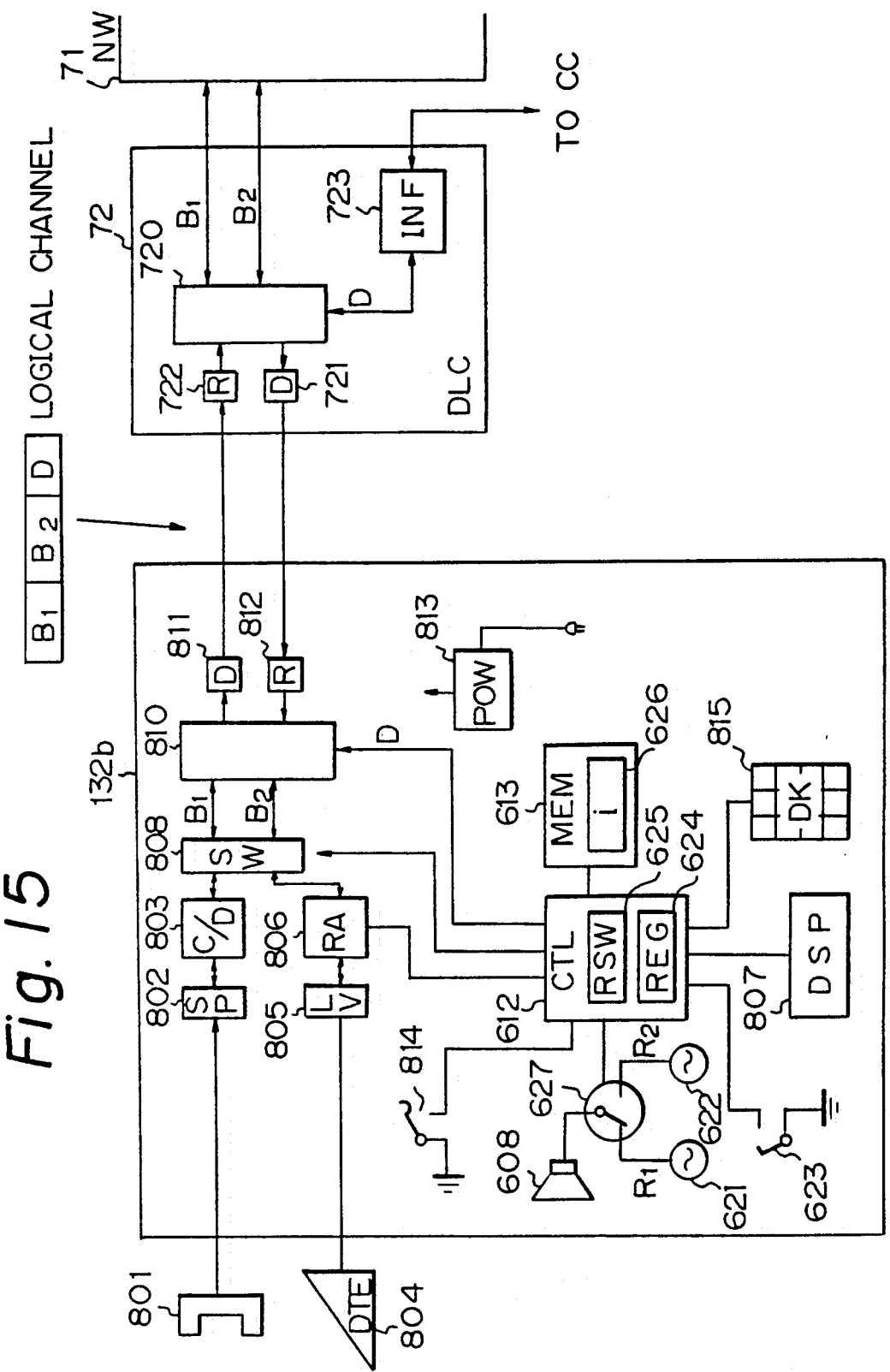
FIG. 15 is a block diagram showing in detail an extension terminal accommodated by the PBX system and a digital line circuit (DLC) in the PBX system according to the second embodiment of the present invention.

FIG. 15 is a block diagram showing an extension terminal accommodated by the PBX system 60, according to another embodiment of the present invention. In FIG. 15 and in FIG. 8, the same parts are represented by the same reference numbers. In FIG. 15, 612 is a controller, 613 is a memory (MEM), 621 and 622 are ringing tone signal resources, 623 is a register key, 624 is a calling party registered identifying information registering part (REG), 625 is a ringing tone signal switch control part (RSW), 627 is a ringing tone signal switching part, and 608 is a speaker.

An extension terminal 132b receives from the network switch 71 calling party identifying information for identifying a calling party when a call connection is set up. The calling party identifying information is for example the calling party address #B and the calling party subaddress #② in the call setup message (ii) shown in FIG. 6.

The calling party registered identifying information registering part (REG) 624 previously stores calling party registered identifying information by a predetermined registering operation carried out by a user of the extension terminal 132b. The calling party registered identifying information is for example the line accessing number α for identifying the communication line 61 shown in FIG. 6.

The controller 612 compares the calling party identifying information with the calling party registered identifying information. Depending on whether or not the calling party registered identifying information is detected in the calling party identifying information, a call indicating sound for informing the user of the fact of the incoming call is changed.

According to the still another embodiment, both the incoming indicating sound is generated and the calling party information is displayed.

In more detail, the calling signal sources 621 and 622 generate specific calling signals R1 and R2 having different frequencies or different intermittent frequencies. The calling signal R1 or R2 is supplied to the speaker 608 so that the user can hear a different call indicating sound.

When the user wants to identify whether the incoming call is from another extension terminal accommodated to the PBX system or from the communication line connected to the ISDN public network (CO) 101, the user may operate the registering key 623 and can input from the key board 815 the calling party registered identifying information α for example "0".

The controller (CTL) 612, after detecting the operation of the registering key 623, drives the calling party registered identifying information registering part (REG) 624. The driven part (REG) 624 stores the calling party registered identifying information α from the keyboard 815 into a registering area 626 in the memory (MEM) 613, as well as displaying it on the display unit (DSP) 807 so that the user can recognize that the calling party registered identifying information is α.

In such a situation, when the received calling party identifying information includes the number α in a predetermined position, the calling signal R1 is sent to the speaker 608. Whereas, if the received calling party identifying information does not include the number α in a predetermined position, the calling signal R2 is sent to the speaker 608.

From the foregoing description, it will be apparent, according to the present invention, when a connection is set up from an ISDN public network to an extension terminal accommodated by a PBX system, since a line accessing number α for identifying a communication line connected between the PBX switching network and the ISDN public network is added to a calling party address to be received by the extension terminal accommodated to the PBX system, the user at the extension terminal can recognize whether an incoming call is from the ISDN public network or from another extension terminal so that the service for the user is improved.

Further, by forming a callback setup message in which the calling party address and the calling party subaddress received by the extension terminal accommodated by the PBX system are inserted as a destination address and a destination subaddress, and by sending the call back setup message from the external terminal to the PBX switching network, the user at the extension terminal can call back the original calling party terminal regardless of whether the calling party terminal is connected to the ISDN public network or the calling party terminal is another extension terminal accommodated to the PBX system. Therefore, even in the connecting system between the ISDN public network and the PBX. system, a call back operation is possible. Consequently service is also improved.

Still further, by previously registering desired calling party registered identifying information for identifying a calling party which the user wants to distinguish, the user can distinguish the desired calling party before responding to an incoming call by hearing the incoming call ringing sound. Accordingly, the extension terminal becomes very convenient.

We claim:

1. A private automatic branch exchange system having an extension line connectable to an extension terminal and being operatively connected through a communication line and through a public network to a calling party terminal, comprising;
   switching network means for switching between the communication line and the extension line;
   control means, operatively connected to said switching network means, for controlling the switching operation of said switching network means, said control means comprising
      line accessing number adding means for forming incoming information by adding a line accessing number to incoming call information so that the communication line is accessible by the extension terminal, and
      means for transmitting said incoming information to the extension terminal; and
   call back means cooperating with the extension terminal for performing a call back operation based on said line accessing number.

2. A private automatic branch exchange system as claimed in claim 1, wherein the communication line includes:
   a central office line connected between the public network and said switching network means.

3. A private automatic branch exchange system as claimed in claim 1, wherein the communication line includes:
   a private line connected between the public network and said switching network means.

4. A private automatic branch exchange system as claimed in claim 1, wherein said switching network means includes:
   means for providing said incoming call information to said control means by modifying a call setup message.

5. A private automatic branch exchange system as claimed in claim 1, further comprising:
   display means operatively connected to the extension terminal for displaying said line accessing number when said extension terminal receives said incoming information.

6. A private automatic branch exchange system as claimed in claim 5, wherein said means for transmitting said incoming information includes:
one of a plurality of channels of the extension line.

7. A private automatic branch exchange system as claimed in claim 6, wherein said plurality of channels include plural data channels and a control channel.

8. A private automatic branch exchange system as claimed in claim 6, wherein said plurality of channels includes plural data channels and a control channel, and said channel for transmitting said incoming information is said control channel.

9. A private automatic branch exchange system as claimed in claim 1, further comprising:
storage means operatively connected to the extension terminal for storing at least a portion of said incoming information;
display means operatively connected to the extension terminal for displaying said portion of said incoming information stored in said storage means;
a plurality of function keys operatively connected to the extension terminal; and
terminal control means, operatively connected to said storage means, said function keys, and said display means, for controlling said storage means, said display means, and said function keys, and for executing a call back operation based on said portion of said incoming information.

10. A private automatic branch exchange system as claimed in claim 9, wherein said storage means includes:
a plurality of storage areas corresponding to said function keys.

11. A private automatic branch exchange system as claimed in claim 10, wherein each of said storage areas includes means for storing said portion of said incoming information from a previous call, further comprising:
detecting means for detecting one of said function keys being pushed;
reading means, responsive to said detecting means, for reading said portion of said incoming information stored in said storage area corresponding to the pushed function key; and
transmitting means for transmitting the read portion of said incoming information to said switching network means.

12. A private automatic branch exchange system as claimed in claim 9, wherein said storage means includes a plurality of storage areas corresponding with said function keys, further comprising:
detecting means for detecting one of said function keys being pushed;
temporary storage means for temporarily storing said portion of said incoming information; and
means for transferring said portion of said incoming information from said temporary storage means to said storage area corresponding to the pushed key detected by said detecting means.

13. A private automatic branch exchange system as claimed in claim 12, wherein said terminal control means includes:
reading means, responsive to said detecting means for reading said portion of said incoming information stored in said storage area corresponding to the pushed function key; and
means for transmitting the read portion of said incoming information to said switching network means.

14. A private automatic branch exchange system as claimed in claim 1, wherein said switching network means includes means for switching between the extension line and another extension line, and said line accessing number is indicative of one of the communication line and the other extension line, further comprising:
determining means for determining whether said line accessing number is indicative of the communication line or the another extension line; and
indication means, responsive to said determining means and operatively connected to the extension terminal, for physically indicating whether said line accessing number is indicative of the communication line or the another extension line.

15. A private automatic branch exchange system as claimed in claim 2, wherein said switching network means includes means for switching between the extension line and another extension line, and said line accessing number is indicative of one of the communication line and the another extension line, further comprising:
determining means for determining whether said line accessing number is indicative of the communication line or the another extension line; and
indication means, responsive to said determining means and operatively connected to the extension terminal, for physically indicating whether said line accessing number is indicative of the communication line or the another extension line.

16. A private automatic branch exchange system as claimed in claim 1, further comprising: registering means for storing calling party registered identifying information upon completion of a predetermined registering operation at the extension terminal; and
indicating means for comparing said incoming information with said calling party registered identifying information, and for physically indicating whether or not said incoming information is the same as said calling party registered identifying information.

17. A private automatic branch exchange system as claimed in claim 1, wherein said line accessing number is indicative of the communication line.

18. A private automatic branch exchange system as claimed in claim 1, further comprising:
registering means for storing calling party registered identifying information upon completion of a predetermined registering operation at the extension terminal; and
indicating means for comparing said incoming information with said calling party registered identifying information, and for physically indicating whether or not said incoming information is the same as said calling party registered identifying information.

19. A private automatic branch exchange as claimed in claim 3, wherein said switching network means includes means for switching between the extension line and another extension line, and said line accessing number is indicative of one of the communication line and the another extension line, further comprising:
determining means for determining whether said line accessing number is indicative of the communication line or the another extension line; and
indication means, responsive to said determining means and operatively connected to the extension terminal, for physically indicating whether said line accessing number is indicative of the communication line or the another extension line.

20. A private automatic branch exchange system as claimed in claim 1, wherein said line accessing number adding means includes:
   means for adding said line accessing number to a calling party address field of said incoming call information.

21. A private automatic branch exchange system as recited in claim 1, further comprising:
   storing means operatively connected to the extension terminal for storing said incoming information.

22. A private automatic branch exchange system as claimed in claim 5, wherein said display means includes:
   means for displaying a calling party address field of said incoming information.

23. A private automatic branch exchange system as claimed in claim 11, wherein said switching network includes:
   means for analyzing said line accessing number received from said transmitting means; and
   call back means for performing a call back operation by transmitting a message including said incoming information to the public network.

24. A method of operating a private exchange system wherein the private exchange system includes an extension terminal and a switching network, and the extension terminal includes a display unit and a memory and is connectable through said switching network, a communication line and a public network to a calling party terminal, comprising the steps of:
   receiving incoming call information from the public network through the communication line;
   forming modified information by adding a line accessing number indicative of the communication line to said incoming call information so that the communication line is accessible by the extension terminal
   transmitting said modified information to said extension terminal;
   displaying said modified information on the display unit;
   storing said modified information in the memory; and
   transmitting a message including said modified information from said memory to the public network, so as to call back the calling party terminal.

* * * * *